Sept. 4, 1956 E. DYKE 2,761,963

RADIO STATION BUILDING STRUCTURE

Filed March 1, 1952 3 Sheets-Sheet 1

INVENTOR.
Edwin Dyke,
BY
Foorman L. Mueller
Atty.

INVENTOR.
Edwin Dyke,
BY
Foorman L. Mueller
Atty.

Sept. 4, 1956 E. DYKE 2,761,963

RADIO STATION BUILDING STRUCTURE

Filed March 1, 1952 3 Sheets-Sheet 3

INVENTOR.
Edwin Dyke,
BY
Foorman L. Mueller
Atty.

United States Patent Office 2,761,963

Patented Sept. 4, 1956

2,761,963

RADIO STATION BUILDING STRUCTURE

Edwin Dyke, Brookfield, Ill., assignor to Motorola, Inc., Chicago, Ill., a corporation of Illinois Application March 1, 1952, Serial No. 274,441

5 Claims. (Cl. 250—15)

The present invention relates to a radio station construction, and more particularly to a station construction especially adapted for use as a relay station in a microwave radio relay communication system.

Microwave radio relay networks are now being widely used to provide both private and governmental communication and signalling facilities. Many of such networks are projected across remote and relatively inaccessible areas of the country. In order to keep the cost of construction as low as possible, the remote relay station should be simply constructed to provide good protection from the weather and reliable supporting foundations for the equipment. Inasmuch as the radio relay equipment may be continuously operated for relatively long periods of time without constant attention by an operator or an engineer, the station housing may be made very compact with a minimum of accessory equipment, the primary objective being to provide a weather-tight housing for the equipment and suitable foundations for supporting the equipment including the associated radiating elements or antennae.

It is an object of the present invention to provide a simple, compact, and economical form of microwave radio station construction which may be used in a radio relay communication system.

Another object of the nivention is to provide an improved and simplified radio station construction for supporting the radio equipment within an enclosure and for supporting the radiating element or elements without the enclosure in a predetermined physical relationship to the radio equipment.

A further object of the invention is to provide a simplified enclosed radio station construction having a compact arrangement to support the elements of the radio equipment, and also at least a portion of the structure in a manner to assure the most economical construction with a minimum of supporting framework.

A feature of the invention is the provision of a housing for enclosing the radio equipment of a radio station, the housing having an internal framework for providing a support for the roof of the housing and at the same time forming a rack for supporting the radio equipment, including equipment within the housing and equipment without the housing.

Another feature of the invention is the formation of a radio station housing having a simple side wall construction, and an essentially flat or plain roof surface arranged to form a closed structure, the roof space being additionally supported by a vertically extending framework within the enclosure and spaced from the side walls, the framework being adapted to support radio equipment within the enclosure and radiating elements above the roof in a predetermined physical relationship to facilitate connections between the radio equipment and the radiating elements.

Yet another feature of the invention as particularly adapted for use as a microwave radio station is the provision of a central framework for supporting the internal span of the roof of the station enclosure, the framework supporting radio equipment within the enclosure in close juxtaposition to the roof plane and further supporting radiating equipment above the roof plane and without the enclosure in such manner that very short lengths of waveguide are required to interconnect the equipment within and without the enclosure and enhanced mechanical rigidity and weather sealing of the entire structure is thereby obtained. Under such circumstances, there is a minimum of microwave distortion due to transmission line length for such stations as are distortion sensitive by virtue of coupling the transmitter oscillator to the antenna which may be assumed to contain at least a slight mismatch.

Another feature of the station arrangement of the invention is a modified form as particularly adapted for use in microwave radio relay network is the provision of a vertically extending central framework for supporting radio equipment at its lower end together with first radiating means including a parabolic reflector, and supporting at its upper end a second beam radiating reflector for redirecting the radio beam from the first reflector, the framework also providing support for the roof structure overlaying the radio equipment to be enclosed by the simple addition of side walls thereàround.

Further objects, features, and the attending advantages of the invention will be apparent with reference to the following specification and drawings, in which.

In practicing the invention, a radio station is provided including an enclosure for radio receiving and/or transmitting equipment. The enclosure may be a simple tent structure, or may be relatively permanent, having suitable footings and concrete block or other suitable side walls. The roof for the enclosure may be of the simplest possible form, such as a comparatively flat plane of sheet metal or fabric. A central framework extends upward from within the enclosure and provides support for the roof, and also functions as a rack to support the radio equipment to be enclosed. Beam radiating means is also supported by the framework in a position above the roof plane to be externally positioned with respect to the enclosed radio equipment. In the particular application of the invention for use in microwave communication systems, the beam radiating means may include a parabolic reflector which, in view of its support on the central framework, is rigidly supported in close predetermined physical relationship to the radio equipment so that a minimum length of wave guide plumbing is required to connect the radio equipment through the roof to the radiating means. According to a second form of the invention, the central framework may be extended upwards through the roof to form a tower for additional radio beam deflecting and directing elements.

Figures 1, 2, 3:
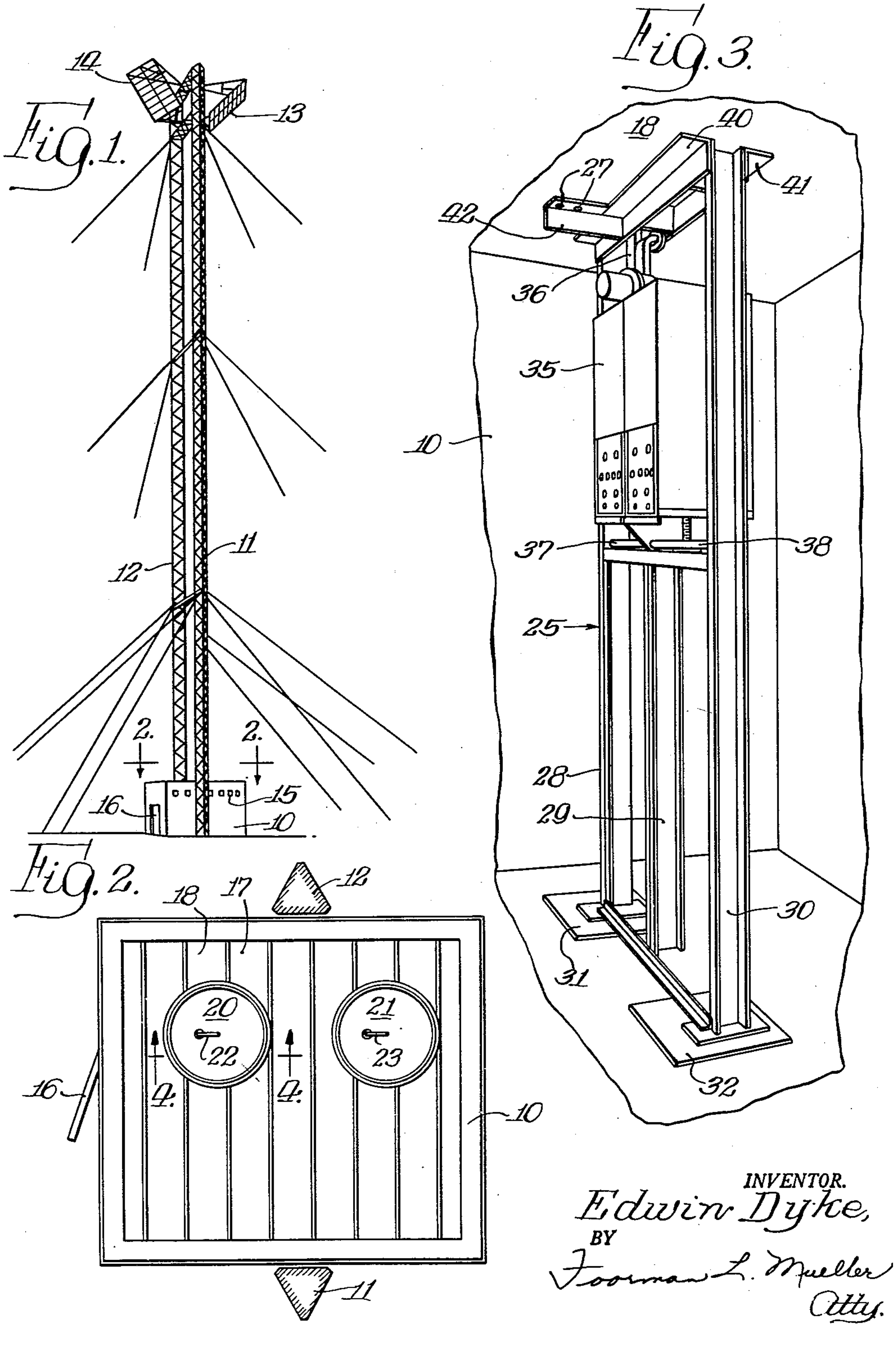
Fig. 1 is a perspective elevation of one form of radio station construction of the invention.
Fig. 2 is a top plan view looking down on the roof of the enclosure shown in Fig. 1.
Fig. 3 is a fragmentary perspective view of the interior of the enclosure of Fig. 1, to show a portion of the supporting framework of the invention.

As shown in Fig. 1, a typical application of the invention for use as a radio relay station of a microwave radio communication system or network comprises an enclosure or building structure 10 positioned between two vertically extending towers 11 and 12. Plane reflector elements 13 and 14 are positioned at the upper end of the towers 11 and 12 to redirect microwave radio beam energy in planes extending horizontally to planes extending vertically to or from the roof of the building 10. In the particular application of the invention being described, the energy directed by each of the beam deflectors 13 and 14 may actually comprise two microwave beams of slightly different frequency and travelling in opposite directions, respectively, so as to simultaneously provide receiving and transmitting facilities in both directions. The building 10 is a simple cubic structure which may be formed of concrete building blocks and may include a flat metal roof. The flat metal roof may be arranged so that water is drained therefrom through the drain openings such as shown at 15. Inasmuch as the building 10 is not intended to provide a shelter for operating personnel, no windows are provided, and the only access to the interior is through the door 16.

Figure 4:
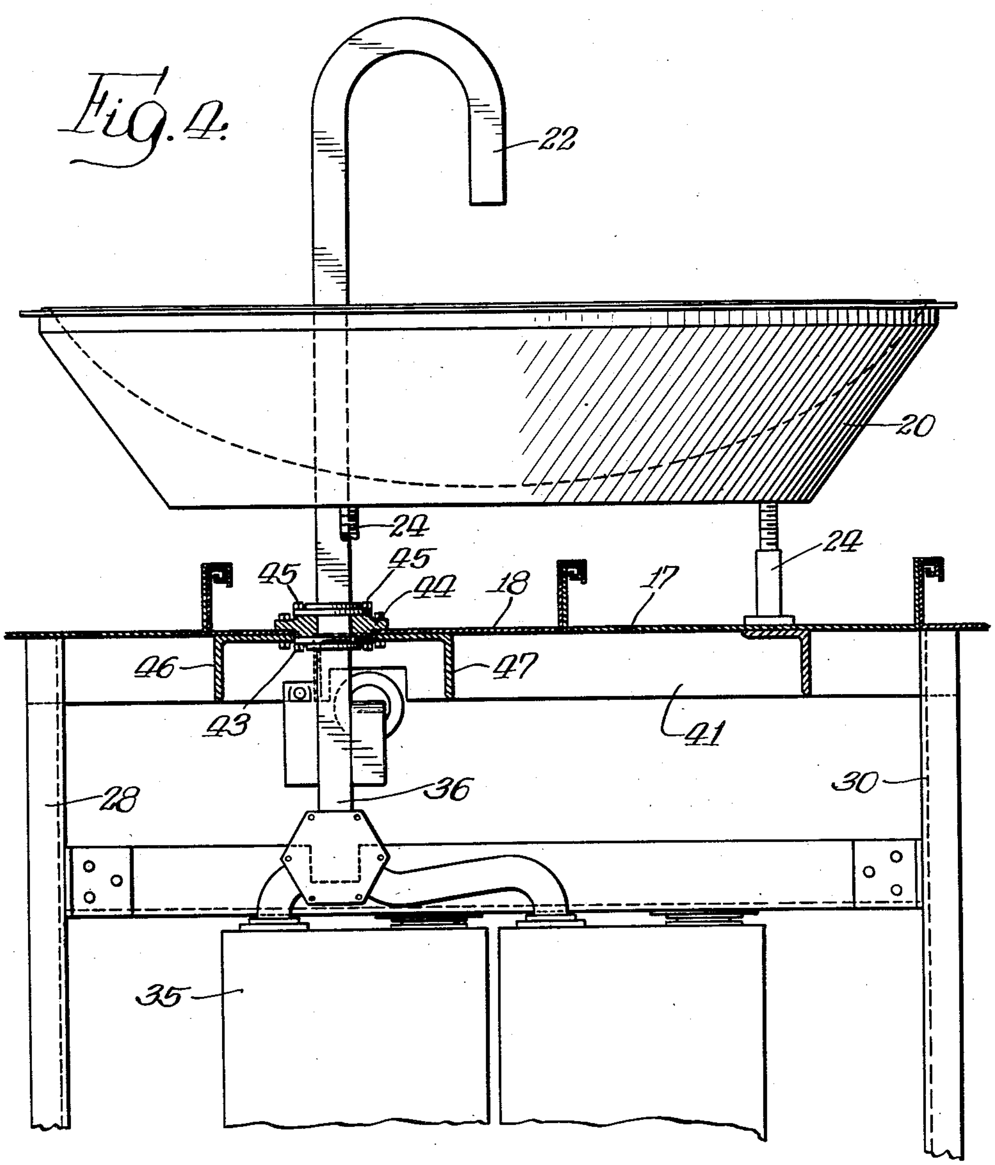
Fig. 4 is a section on the line 4—4 in the direction of the arrows on Fig. 2.

As shown in Figs. 2 and 4 of the drawings, the roof of the building is formed of a plurality of metal strips or channels such as 17 and 18, which are assembled together to form a simple essentially flat roof planar surface. The parabolic reflectors 20 and 21 are mounted immediately above the roof plane and are provided with antenna horns at 22 and 23 positioned at the focal point of the parabolic reflector and adapted to receive and transmit microwave energy. The parabolic reflector 20 may be positioned on the roof surface to be in alignment with the plane reflector 14, whereas the parabolic reflector 21 may be positioned to be in alignment with the plane reflector 13. The supporting posts for either reflector 20 or 21, one of which is shown at 24 may be adjustable to enable the reflectors to be tilted to obtain the correct alignment with the plane reflectors.

Each of the parabolic reflectors 20 and 21, which may be a comparatively heavy structure to be supported on the center span of the roof sheets 17 and 18, is actually supported by the internal frame member of the building structure. One of the internal frame members is generally shown at 25 in Fig. 3 of the drawings wherein the bolts 27 are connected through the roof plane 18 to support the parabolic reflector 20. The framework 25 is comprised of a number of vertically extending steel angle members 28, 29, and 30 which are suitably mounted on concrete footings 31 and 32. The vertically extending beam elements 28, 29 and 30 are so arranged as to provide a rack structure for supporting the radio equipment 35 which is connected by means of the wave guide plumbing 36 to the antenna horn 22 of the parabolic reflector 20. Handwheels 37 and 38 enable the radio equipment 35 to be moved vertically within the rack structure in order to join the antenna connections of the radio equipment with the microwave plumbing 36 extending through the roof of the housing.

As shown in Figs. 3 and 4 of the drawings, the upper ends of the vertically extending beam members 28 and 30 are bridged by the angle elements 40 and 41 to which may be secured additional frame elements 42. The angle beams 40 and 41 provide support for the roof channel members such as shown at 17 and 18, and also provide support for the parabolic reflector 20 of the beam radiating means. In such an arrangement, it is not necessary to provide any other skeleton framework for the building, the entire span loading of the roof being supported by the concrete block side walls and the central supporting framework which includes at least the vertically extending beams 28 and 30.

The waveguide connection 36 that extends from the top of the radio equipment 35 may be of rigid construction and of quite short length and is bolted at 43 to the flange of a feed through disc or annular member 44. The antenna horn 22 is also rigid and is bolted at 45 to the feed through disc 44. The disc 44 is supported on the channel members 46 and 47 which are secured between the channel members 40 and 41. The disc 44 therefore functions as both a weather sealed passage for interconnecting the waveguide elements and a support for the waveguide elements which are positioned on both sides of the roof plane.

Figures 5, 6:
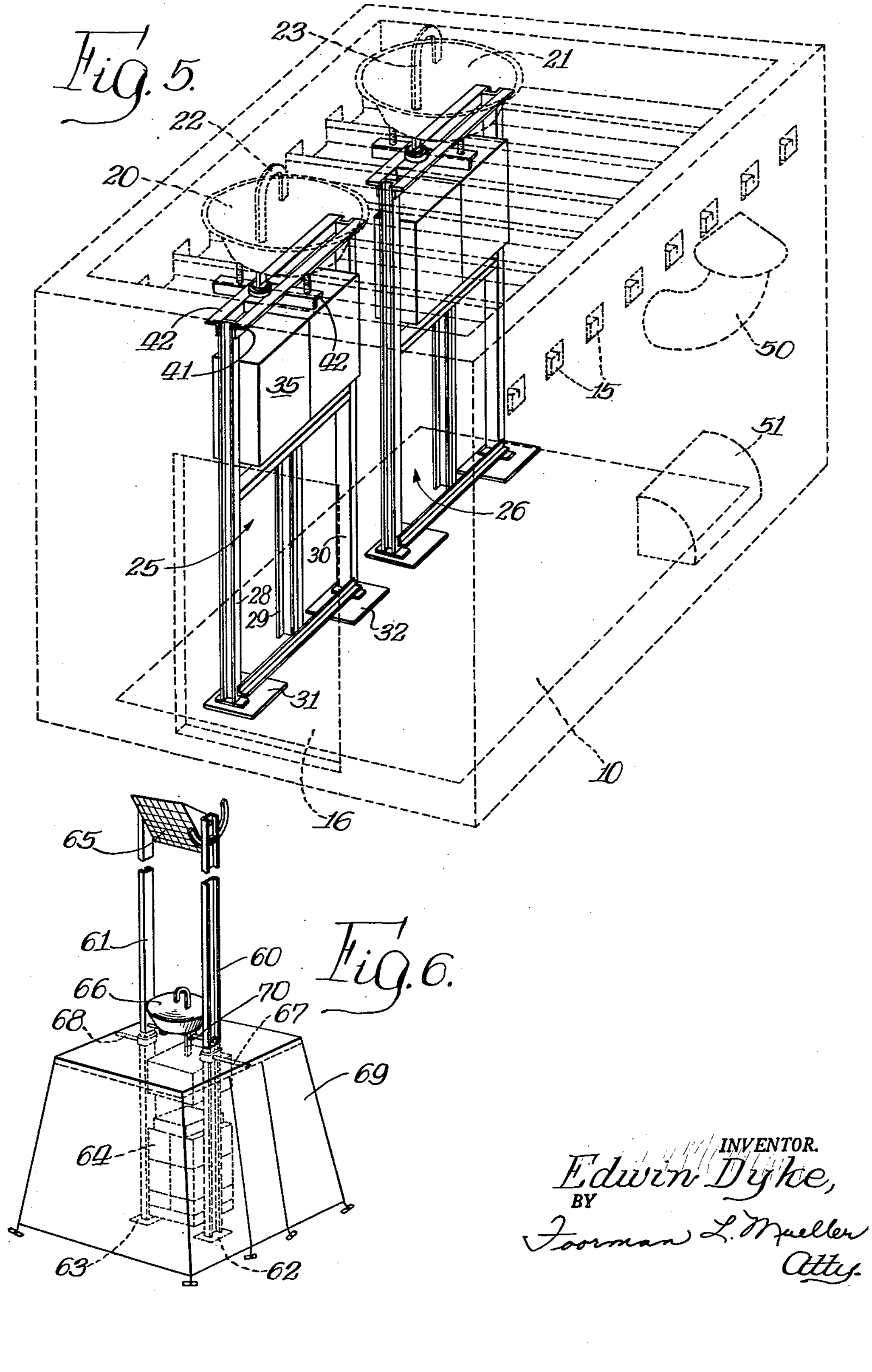
Fig. 5 is a phantom perspective of the preferred form of building construction for enclosing and supporting the radio equipment and also supporting the external beam radiating means.
Fig. 6 is a perspective view of a modified form of the invention.

As most clearly shown in Fig. 5 of the drawings, the radio station construction of the invention as particularly adapted for use with a microwave radio relay network in an installation such as shown in Fig. 1 of the drawings, actually includes a pair of internal vertically extending framework such as generally shown at 25. Therefore, the parabolic reflector 21 is supported by the internal framework generally shown at 26 in Fig. 5 of the drawings. Certain other details of the building structure 10 are also shown in Fig. 5 of the drawings where it will be seen that the side walls extend above the plane of the roof to provide additional side shelter for the parabolic reflectors 20 and 21. An optional form of ventilation for the interior of the building 10 is also shown by the dotted lines at 50 and 51.

A simpler form of the invention is shown in Fig. 6 of the drawings wherein a single unit radio receiving and sending equipment is illustrated. When used in a radio relay system a single unit may be used at the terminal stations, and two interconnected units are required at the relay stations. A pair of vertically extending beams 60 and 61 are fastened at their bottom ends to suitable footings 61 and 63. The vertically extending beams 60 and 61 form a rack structure in which the radio receiving and sending equipment 64 is supported. The upper ends of the vertically extending beams 61 are arranged to support a plane reflector 65 for redirecting the beam of radiated energy to or from the parabolic reflector 66 in a horizontal plane. Fastened to the vertically extending beams 60 and 61 are the horizontally extending frame elements 67, 68 from which an umbrella tent structure 69 is supported to enclose the radio equipment 64. The parabolic reflector 66 is pivotally mounted on the cross member 70 extending between the vertical beams 60 and 61, and the parabolic reflector 66 may be movable to a limited degree to vary the direction of the beam radiated therefrom. Similarly the plane reflector 65 may be adjusted for different beam directions. The details for adjusting the parabolic reflector and the plane reflector are not shown, inasmuch as they do not form a part of the invention, and it is apparent that various mechanisms for such purposes may be provided.

The arrangement of the invention as described in the foregoing provides a suitable enclosure for radio equipment, the enclosure being of the simplest form, yet having adequate strength to support the comparatively heavy elements of the outside radio equipment such as the beam radiating antenna including parabolic and plane reflectors. As described, the radio equipment enclosure is provided with a vertically extending framework within the enclosure which functions to support the span of the roof and also provides a rack for supporting the radio equipment within the enclosure together with a support for the beam radiating elements positioned above the roof and outside of the enclosure. As disclosed by a modified form of the invention, the vertically extending framework may be extended through the roof of the building to form a tower for additional beam directing and reflecting elements.

It should be understood that various modifications may be made within the spirit of the invention and scope of the appended claims.

I claim:

1. A unitary microwave radio relay station including in combination, an enclosure having weatherproof roof and sidewall elements, a central framework within said enclosure connected to and supporting said roof element, microwave radio equipment carried by said framework within said enclosure, radiating means including a parabolic reflector positioned above and fastened through said roof element to said framework and directly supported thereby in substantially fixed position with respect to said radio equipment, and rigid waveguide means extending through said roof element for connecting said microwave radio equipment to said radiating means.

2. A microwave radio relay station including in combination, an enclosure having roof and sidewall elements, a central framework within said enclosure for supporting said roof element, microwave radio equipment carried by said framework within said enclosure, radiating means including a parabolic reflector positioned above and fastened through said roof element to said framework and directly supported thereby in adjustable relation thereto, a flanged annular member supported by said framework and extending through said roof element, waveguide means connecting said radio equipment to said annular member, and waveguide means connecting said radiating means to said annular member.

3. A unitary microwave radio relay station including in combination, foundation means, a central framework supported on said foundation means, microwave radio equipment carried by said framework, an enclosure having roof and sidewall elements for protecting said radio equipment from the weather, said roof element being secured to and supported from said framework, antenna means including a parabolic reflector positioned above said roof element, support means for said reflector extending through said roof element to said framework and fastened to said framework and directly supported thereby, said support means holding said parabolic reflector in substantially fixed position with respect to said radio equipment, and rigid waveguide means extending through said roof element for connecting said microwave radio equipment to said radiating means.

4. A radio station in accordance with claim 3 wherein said antenna means includes a slanting reflector above said parabolic reflector and said support means supports said slanting reflector as well as said parabolic reflector from said framework within said enclosure.

5. A radio station in accordance with claim 3 wherein said enclosure is formed by a tent having the roof element thereof supported from said central framework of the station.

References Cited in the file of this patent

"New Utility Unit Has Simplified Design," American Builder for January 1950, page 170.

"A Broad-Band Microwave Relay System Between New York and Boston," by Thayer, Roetken, Friis and Durkee, Proc. IRE, vol. 37, No. 2, February 2, 1949, pages 183–188.

FM-TV Magazine (formerly FM, and FM Radio-Electronics), January, 1950, page 17.